(12) United States Patent
Vukovic et al.

(10) Patent No.: US 11,563,503 B2
(45) Date of Patent: Jan. 24, 2023

(54) VEHICLE WI-FI ACCESS POINT DETECTION AND MITIGATION

(71) Applicant: FORD GLOBAL TECHNOLOGIES, LLC, Dearborn, MI (US)

(72) Inventors: Ivan Vukovic, Birmingham, MI (US); Jovan Milivoje Zagajac, Ann Arbor, MI (US); Syed Amaar Ahmad, Canton, MI (US); Colin Turner Lieberman, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 17/021,268

(22) Filed: Sep. 15, 2020

(65) Prior Publication Data
US 2022/0085899 A1 Mar. 17, 2022

(51) Int. Cl.
| | |
|---|---|
| *H04B 17/327* | (2015.01) |
| *H04W 4/40* | (2018.01) |
| *H04W 76/18* | (2018.01) |
| *H04W 72/04* | (2009.01) |
| *H04L 43/0894* | (2022.01) |
| *H04L 43/0829* | (2022.01) |
| *H04L 43/0823* | (2022.01) |
| *H04W 76/11* | (2018.01) |

(52) U.S. Cl.
CPC ....... *H04B 17/327* (2015.01); *H04L 43/0829* (2013.01); *H04L 43/0847* (2013.01); *H04L 43/0894* (2013.01); *H04W 4/40* (2018.02); *H04W 72/0453* (2013.01); *H04W 76/11* (2018.02); *H04W 76/18* (2018.02)

(58) Field of Classification Search
CPC ............ H04L 43/0829; H04L 43/0823; H04L 43/0847; H04L 43/0876; H04L 43/0894; H04L 67/36; H04W 4/40; H04W 4/30; H04W 4/46; H04W 4/48; H04W 4/021; H04W 72/0453; H04W 72/044; H04W 76/11; H04W 76/18; H04W 24/10; H04W 24/08
See application file for complete search history.

(56) References Cited

U.S. PATENT DOCUMENTS

| | | | |
|---|---|---|---|
| 10,291,744 B2 | 5/2019 | Sun | |
| 10,327,254 B2 | 6/2019 | Thanayankizil et al. | |
| 2002/0068569 A1* | 6/2002 | Chen | H04W 76/19 455/437 |

(Continued)

*Primary Examiner* — Jeffrey M Rutkowski
*Assistant Examiner* — Sudesh M Patidar
(74) *Attorney, Agent, or Firm* — Joseph Zane; Brooks Kushman P.C.

(57) ABSTRACT

A vehicle includes a human-machine interface (HMI) device, configured to interact with a user; a wireless transceiver; and a controller, configured to responsive to the wireless transceiver detecting a signal strength of a wireless transmission at a predefined frequency exceeding a predefined threshold, output a message via the HMI device to ask a user to switch off a wireless device associated with the user, and responsive to continuing to detect the signal strength of the wireless transmission exceeding the threshold, output an alert, via the HMI device, to inform the user of a vehicle-to-everything (V2X) communication failure and record an identity of the wireless transmission and a location of the vehicle.

11 Claims, 6 Drawing Sheets

(56) References Cited

U.S. PATENT DOCUMENTS

| | | | | |
|---|---|---|---|---|
| 2012/0005177 | A1* | 1/2012 | Bao | H04L 43/0829 |
| | | | | 707/705 |
| 2012/0134280 | A1* | 5/2012 | Rotvoid | H04B 17/24 |
| | | | | 370/252 |
| 2013/0242783 | A1* | 9/2013 | Horn | H04W 28/08 |
| | | | | 370/252 |
| 2014/0378054 | A1* | 12/2014 | Wang | H04B 15/00 |
| | | | | 455/41.2 |
| 2015/0327328 | A1* | 11/2015 | Novak | H04W 36/06 |
| | | | | 455/11.1 |
| 2018/0013594 | A1* | 1/2018 | Mukkavilli | H04W 16/14 |
| 2018/0035434 | A1* | 2/2018 | Thanayankizil | H04W 76/10 |
| 2018/0048577 | A1* | 2/2018 | Gulati | H04W 52/362 |
| 2019/0045454 | A1* | 2/2019 | Haran | H04L 5/001 |
| 2019/0164423 | A1* | 5/2019 | Bai | G08G 1/163 |
| 2019/0200366 | A1* | 6/2019 | Park | H04W 72/0486 |
| 2020/0029233 | A1* | 1/2020 | Gallagher | G07C 5/008 |
| 2020/0107214 | A1* | 4/2020 | Vlachou | H04W 24/10 |
| 2021/0076184 | A1* | 3/2021 | Lee | H04W 4/029 |
| 2021/0227365 | A1* | 7/2021 | Vassilovski | H04W 52/44 |
| 2021/0360639 | A1* | 11/2021 | Weissman | G08B 25/006 |
| 2022/0095152 | A1* | 3/2022 | Szilagyi | H04L 67/56 |

* cited by examiner

VEHICLE WI-FI ACCESS POINT DETECTION AND MITIGATION

TECHNICAL FIELD

The present disclosure generally relates to a wireless transmission detection system. More specifically, the present disclosure relates to a system to detect Wi-Fi transmissions near a vehicle.

BACKGROUND

Vehicle-to-everything (V2X) technology has becoming increasingly popular in the automobile industry. Data may be exchanged between vehicles and roadside infrastructure using the V2X technology. Institute of Electrical and Electronics Engineers (IEEE) 802.11p standard and The Third Generation Partnership Project (3GPP) Long-Term Evolution (LTE) standard both include designated Intelligent Transportation System (ITS) band to carry the V2X communication. The ITS band is a licensed band of 5.9 GHz (5.855-5.925 GHz) which overlaps with the frequency of one or more unlicensed bands. For instance, ITS band partially overlaps with Unlicensed National Information Infrastructure (U-NII)-4 band ranging from 5.850-5.925 GHz designated by IEEE 802.11 ac standard.

SUMMARY

In one or more illustrative embodiments of the present disclosure, a vehicle includes a human-machine interface (HMI) device, configured to interact with a user; a wireless transceiver; and a controller, configured to responsive to the wireless transceiver detecting a signal strength of a wireless transmission at a predefined frequency exceeding a predefined threshold, output a message via the HMI device to ask a user to switch off a wireless device associated with the user, and responsive to continuing to detect the signal strength of the wireless transmission exceeding the threshold, output an alert, via the HMI device, to inform the user of a vehicle-to-everything (V2X) communication failure and record an identity of the wireless transmission and a location of the vehicle.

In one or more illustrative embodiments of the present disclosure, a method for a vehicle includes calculating, via a controller, an average packet-error-rate (PER) for a V2X communication via a wireless transceiver within a predefined period of time; verifying, via the controller, a count of entities communicating with the vehicle via the V2X communication and a distance of each entity from the vehicle; calculating, via the controller, a PER threshold using the count and distance; and responsive to verifying the average PER exceeding the PER threshold, informing a user of the vehicle via a human-machine interface (HMI) device.

In one or more illustrative embodiments of the present disclosure, a non-transitory computer-readable medium includes instructions, when executed by a computer of a vehicle, make the vehicle to scan for wireless signals having a predefined frequency; responsive to detecting a wireless transmission at the predefined frequency having a signal strength exceeding a predefined threshold, output a message via a human-machine interface (HMI) device to ask a user to switch off a wireless device associated with the user; responsive to receiving a user confirmation input via the HMI device, rescan for wireless signals having predefined frequency; and responsive to continuing to detect the signal strength of the wireless transmission exceeding the threshold, alert driver to the failure of V2X communication of the vehicle and record an identity of the wireless transmission and a location of the vehicle.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a wireless transmission detection system. More specifically, the present disclosure proposes a vehicle detecting and mitigation wireless transmissions which may interfere with the ITS transmissions.

Figure 1:
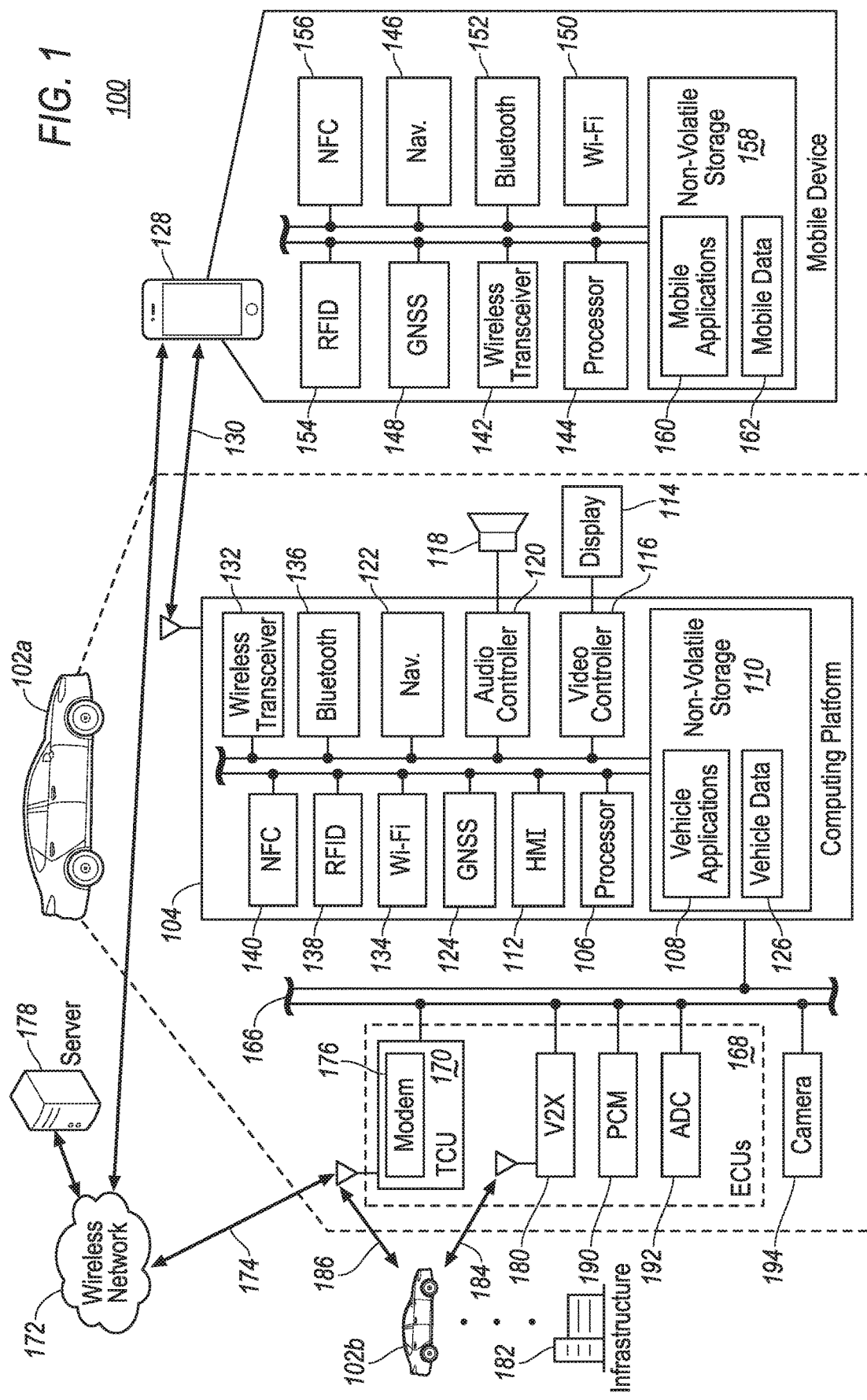
FIG. 1 illustrates an example block topology of a surrogate vehicle system of one embodiment of the present disclosure.

Referring to FIG. 1, an example block topology of a vehicle system 100 of one embodiment of the present disclosure is illustrated. A vehicle 102a may include various types of automobile, crossover utility vehicle (CUV), sport utility vehicle (SUV), truck, recreational vehicle (RV), boat, plane, or other mobile machine for transporting people or goods. In many cases, the vehicle 102a may be powered by an internal combustion engine. As another possibility, the vehicle 102a may be a battery electric vehicle (BEV), or a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, data analysis, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102a. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102a. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, an ultra-wide band (UWB) transceiver (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102a via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102a configured to perform various operations. For instance, the computing platform may be configured to communicate with a TCU 170 configured to control telecommunication between vehicle 102a and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities.

The ECUs 168 may further include a V2X controller 180 configured to communicate with one or more fleet vehicles 102*b* as well as infrastructures 182 (a.k.a. roadside units (RSUs)) via a wireless V2V or V2X connection. For instance, the V2X controller 180 may be configured to support DSRC and/or cellular vehicle-to-everything (CV2X) connections to communicate with the fleet vehicle 102*b* and/or infrastructure 182 via V2X connection 184. The fleet vehicle 102*b* may include various vehicles associated with the same or different manufacturers and subscribed to the data sharing feature enabled by the vehicles system of the present disclosure. The infrastructure 182 may include various devices associated with road traffic and provided with data process and communication capabilities. For instance, the infrastructure may include a traffic light, traffic meter, camera, parking meter, toll device or the like configured to support an ITS. Additionally or alternatively, the TCU 170 may be configured to support the V2X communications (e.g. CV2X) to communicate with the fleet vehicle 102*b* and/or the infrastructure 182 via a V2X connection 186. The ECUs 168 may further include a powertrain control module (PCM) 190 configured to perform various control and operations of the powertrain of the vehicle 102*a*. The ECUs 168 may further include an autonomous driving controller (ADC) 192 configured to provide autonomous driving features to the vehicle 102*a*. It is noted that the ECUs 168 introduced here are merely examples and the actual vehicle 102*a* may be provided with more ECUs or controllers configured to perform various operations. Each ECU 168 may be provided with processing and storage capabilities operated by computer software. The computing platform 104 may be further configured to communicate with one or more vehicle cameras 194 configured to capture images and/or videos inside and/or outside the vehicle 102*a*. For instance, the vehicle cameras 194 may include a dash camera facing forward configured to capture images in front of the vehicle 102*a*. Additionally or alternatively, the cameras 194 may be provided with a surrounding view feature configured to capture a 360-degree view around the vehicle 102*a*.

Figure 2:
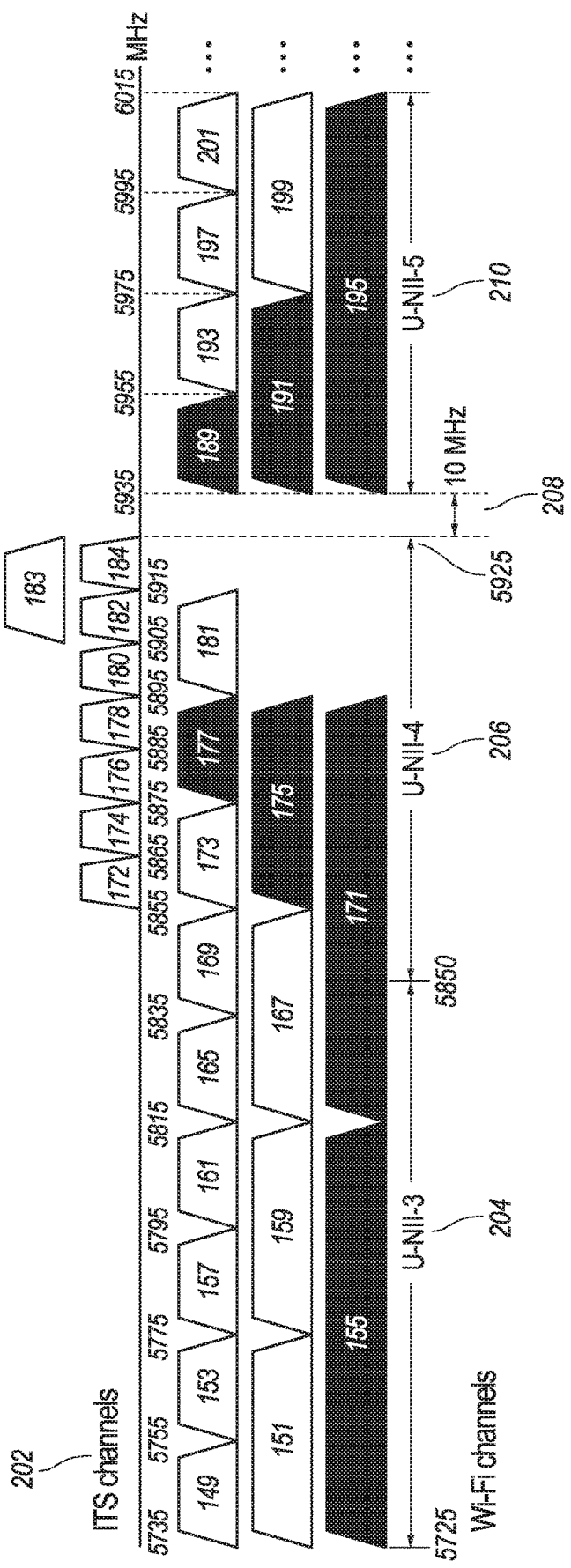
FIG. 2 illustrates an example frequency diagram for ITS channels with adjacent unlicensed bands of one embodiment of the present disclosure.

Referring to FIG. 2, an example frequency diagram 200 for a few ITS channels with adjacent unlicensed channels of one embodiment of the present disclosure is illustrated. As a few non-limiting examples, ITS channels 202 may include Channel 172 ranging from 5.855-5.865 GHz; Channel 174 ranging from 5.865-5.875 GHz; Channel 176 ranging from 5.875-5.885 GHz; Channel 178 ranging from 5.885-5.895 GHz; Channel 180 ranging from 5.895-5.905 GHz; Channel 182 ranging from 5.905-5.915 GHz; and Channel 184 ranging from 5.915-5.925 GHz in frequency. Multiple ITS channels may be combined to form a new channel. For instance, Channel 182 and Channel 184 may be combined to form an ITS Channel 183 ranging from 5.905-9.925 GHz in frequency. Each ITS channel has a 10 MHz or 20 MHz bandwidth. For instance, each even-numbered ITS channel (e.g. Channel 182) may have a 10 MHz bandwidth, whereas each odd-numbered ITS channel (e.g. Channel 183) may have a 20 MHz bandwidth. The frequency of ITS channels 202 may overlap and/or be adjacent to the frequency one or more Wi-Fi channels including a U-NII-3 band 204 ranging from 5.725-5.850 GHz; a U-NII-4 band 206 ranging from 5.850-5.925 GHz; and a proposed U-NII-5 210 band ranging from 5.925-6.425 GHz in frequency. Each U-NII band may include a plurality of channels. For instance, U-NII-3 band may include Channel 149 ranging from 5.735-5.755 GHz; Channel 153 ranging from 5.755-5.775 GHz; Channel 157 ranging from 5.775-5.795 GHz; Channel 161 ranging from 5.795-5.815 GHz; and Channel 165 ranging from 5.815-5.835 GHz in frequency. The U-NII-4 band may include Channel 169 ranging from 5.835-5.855 GHz; Channel 173 ranging from 5.855-5.875 GHz; Channel 177 ranging from 5.875-5.895 GHz; and Channel 181 ranging from 5.895-5.915 GHz. Each of the above U-NII channel has a bandwidth of 20 MHz. Multiple channels from one or more U-NII bands may be combined to form a new channel having a greater bandwidth. For instance, Channel 149 and Channel 153 may be combined as Channel 151; Channel 157 and Channel 161 may be combined as Channel 159; Channel 165 and Channel 169 may be combined as Channel 167; and Channel 173 and Channel 177 may be combined as Channel 175 each of which having a 40 MHz bandwidth. Channel 151 and Channel 159 may be further combined as Channel 155; and Channel 167 and Channel 175 may be further combined as Channel 171 each having an 80 MHz bandwidth.

The frequency of ITS channels 202 may further overlap or be adjacent to the frequency of the proposed U-NII-5 band ranging from 5.925-6.425 GHz having multiple channels. Since the specification of U-NII-5 band has not been finalized yet, the numbering and frequency of each specific channel may vary depending of the specific version and implementation. However, the embodiment of the present disclosure may apply to various versions of U-NII-5 band under substantially the same concept. U-NII-5 band may include Channel 189 ranging from 5.935-5.955 GHz; Channel 193 ranging from 5.955-5.975 GHz; Channel 197 ranging from 5.975-5.995 GHz; and Channel 201 ranging from 5.995-6.015 GHz each having a 20 MHz bandwidth. Channel 189 and channel 193 may be combined as Channel 191; and Channel 197 and Channel 201 may be combined as Channel 199 each having a 40 MHz bandwidth. Channel 191 and Channel 199 may be further combined as Channel 195 Having an 80 MHz bandwidth.

As illustrated in FIG. 2, the frequency of one or more ITS channels overlap with the frequency of one or more U-NII channels. For instance, ITS channel 176 and channel 178 completely or partially overlap U-NII channels 177, 175 and 171, and therefore may be particularly vulnerable to the interference from those U-NII channels. Wireless signal interference may be caused not only by transmission frequency overlap, but also adjacent channels transmitting wireless signals in close frequencies. For instance, ITS channel 184 may interfere with U-NII-5 189, 191 and 195 despite a 10 MHz gap 208 applied between the channels.

Figure 3:
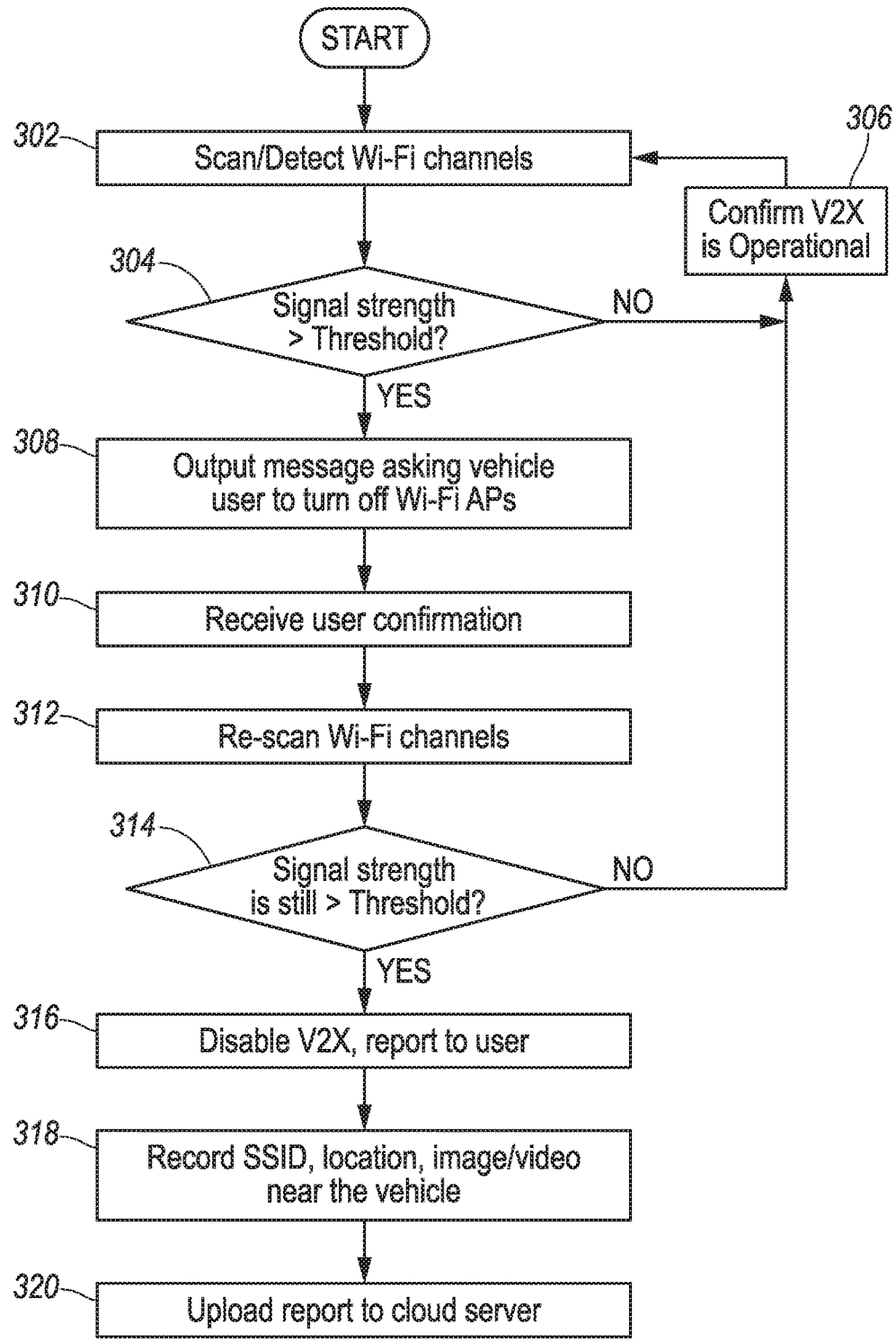
FIG. 3 illustrates an example flow diagram for a process of one embodiment of the present disclosure.

Referring to FIG. 3, an example flow diagram for a process 300 of one embodiment of the present disclosure is illustrated. With continuing reference to FIGS. 1 and 2, the process 300 may be implemented via the vehicle 102*a* to detect signal interference with V2X communications. In the present example, the wireless transceiver 132 and/or the TCU 170 may be configured to detect and scan Wi-Fi channels to confirm a Wi-Fi transmission presence. This scanning can be periodic. Alternatively, the scanning may be triggered responsive to an OOBE interference is detected (to be discussed in detail below). At operation 302, the computing platform 104 activates a Wi-Fi scan using the wireless transceiver 132 to detect if there is any wireless transmission that may interfere with the V2X communications of the vehicle 102*a*. For instance, the computing platform 104 may scan one or more predefined U-NII Wi-Fi channels having a transmission frequency overlapping or adjacent to the frequency of designated ITS channels 202 in which the V2X communication of the vehicle 102*a* is configured to operate. In case that the vehicle 102*a* is configured to operate in ITS channels 172-184, the computing platform 104 may be configured to scan for Wi-Fi channels 169, 173, 177, 181, 167, 175, 171, 155, 189, 191 and 195 because these channels may be more likely to cause signal interference. Responsive to detecting the signal transmission in one or more of those predefined Wi-Fi channels, at operation 304, the computing platform 104 verifies if the signal strength of the detected transmission is above a predefined threshold to cause interference with the V2X communications. There are multiple mechanisms to verify the signal strength. The computing platform 104 may measure a received signal strength indicator (RSSI) of a Beacon message received from the wireless transmission. The RSSI of the Beacon message is compared against a threshold such as L(x)−104 dBm, where L(x) is the channel-dependent leakage attenuation. Alternatively, a L(x)+V2X interference impact threshold of −108 dBm/MHz may be used/the process proceeds to operation 306 and the computing platform 104 confirms with the vehicle user that the V2X communication is operation via by outputting a message via the HMI controls 112. Otherwise, if the RSSI of the Beacon message is above the threshold indicative of sufficient interference is detected, the process proceeds to operation 308 and the computing platform 104 outputs a message via the HMI controls 112 to ask the vehicle user to switch off any known Wi-Fi access points (APs). The system may further detect and output the name of the AP to facilitate the user operation. For instance, The Wi-Fi AP causing the interference may be a Wi-Fi hotspot via a phone operated by a user to share the network with other users while riding in the vehicle 102*a*. Responsive to receiving the vehicle request to turn off, the user may temporarily or permanently switch off the AP and make an input to the computing platform 104 by touching a button via the HMI controls 112 to confirm that the AP is switched off. Responsive to receiving the confirmation input from the user at operation 310, the process proceeds to operation 312 and the computing platform 104 rescans for any interfering Wi-Fi channels.

At operation 314, if the computing platform 104 detects that the signal strength of the interfering channels is below the predefined threshold, the process returns to operation 306. Otherwise, if the computing platform 104 detects the signal strength of the interfering channel is still above the predefined threshold, indicative of the source of the signal interference may be from elsewhere, the process proceeds to operation 316 and the computing platform 104 disables the V2X communications. Additionally, a message may be output to inform the vehicle user about the disablement of the V2X communications. For instance, if the V2X communications are required for autonomous driving by the ADC 192, the message may advise the user that the autonomous driving feature is disabled and the driving may need to switch back to the manual driving mode. Alternatively, the computing platform may disable the V2X safety applications that rely on the V2X functioning properly. An HMI message may be output to inform the user that the V2X safety application has been impaired. In this case, V2X system may continue sending and receiving V2X messages but the safety application may no longer generate alerts because system is unreliable. At operation 318, the computing platform 104 records identifications of the interfering devices such as the SSID of the interfering Wi-Fi AP, model/serial number of the router, the location where the interference is detected via the GNSS controller 124, and/or capture an image of surrounding the vehicle 102*a* via cameras 194 to prepare to report the wireless transmission violation. At operation 320, the computing platform 104 uploads the information collected in the previous operation to the cloud server 176 associated with law enforcement authority to report violation.

In general, a U-NII device causing interference to the V2X communications of the vehicle may be a device brought into the vehicle by a vehicle user (e.g. the mobile device 128). Alternatively, the device causing interference may be a fixed device or a mobile device outside the vehicle. In one embodiment of the present disclosure, the vehicle 102*a* may be configured to alert the vehicle operator responsive to determining the interfering device is located inside the vehicle based on a persistent signal strength and which is not in the control of the computing platform 104. The vehicle 102*a* may be configured to discriminate between a fixed outside-vehicle source of interference and a Wi-Fi device inside the vehicle when the vehicle is in motion using the GNSS controller 124. For instance, if the vehicle 102*a* only detects an interference at a particular location, such as at a particular intersection, this would suggest that the interference is external. On the contrary, if the interference is present and does not change while the vehicle is in motion, this would suggest the interfering device is onboard the vehicle. The vehicle 102*a* may be further configured to discriminate between an outside fixed device and outside mobile device by repeating a route on which an outside interference is detected. For instance, if the vehicle 102*a* repeatedly detect the same interference source at the same location, the outside interference may be more likely caused by a fixed device. Otherwise, the outside interferences may be more likely from a mobile device. The vehicle 102*a* may be further configured to only alert vehicle user about an onboard device after the interference is observed at multiple locations to avoid nuisance warnings for fixed outside sources of interference.

In an alternative example, the vehicle 102*a* may be configured to indirectly measure the signal interference using an average packet error rate (PER) for the V2X communications. The vehicle 102*a* may determine the average PER for the number of vehicles within a certain distance (e.g. 100 m) of the vehicle within a past time interval (e.g. 10 seconds). This measurement can be performed, for example, every second. If the average PER with the range is significantly larger than the usual average PER for the actual number of in-range vehicles, then there may be an indication of interference from an indeterminate cause (e.g. Wi-Fi). The V2X may then be disabled for a duration and the driver is informed about the change. The indirect signal interference measurement may be used in addition to or in lieu of the direct signal measurement described with reference to FIG. 2.

Figure 4:
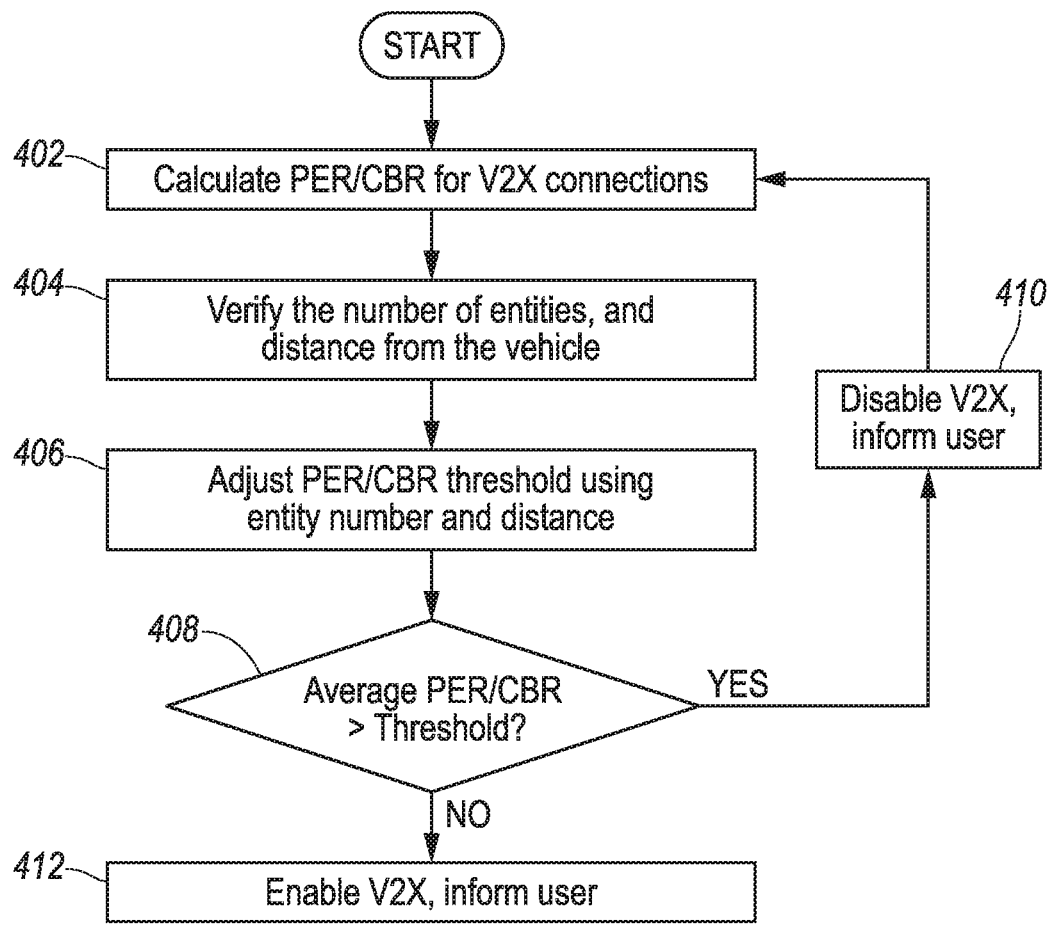
FIG. 4 illustrates an example flow diagram for a process of another embodiment of the present disclosure.

Referring to FIG. 4, an example flow diagram for a process 400 of another embodiment of the present disclosure is illustrated. With continuing reference to FIGS. 1-3, the vehicle 102*a* may indirectly detect signal interference in the present embodiment. The process 400 may be implemented via one or more components including the computing platform 104, the TCU 170 and/or the DSRC controller 180 of the vehicle 102*a* individually or collectively. For simplicity purposes, the following description will be made with reference to the computing platform 104. At operation 402, the computing platform 104 calculates an average packet error rate (PER) for the V2X communications within a predefined period of time. For instance, the average PER may be for a past ten seconds time interval updated every second. At operation 404, the computing platform 104 verifies the numbers/counts of entities communicating with the vehicle 102*a* via the V2X links and the distance of each entity from the vehicle 102a. The average PER may dependent on the number of communicating entities and the transmission distance from the entities. As a general rule, an increasing number of entities and a longer distance may increase the PER of the V2X communications. To more accurately measure the signal interference, a variable PER threshold may be calculated using the number of communicating entities and the distance from the entities at operation 406. As an example, the PER threshold may increase with a greater entity number and/or long distance, and may decrease with a fewer entity number and/or shorter distance. At operation 408, the computing platform 104 compares the average PER against the threshold as calculated. Response to detecting the average PER as detected exceeds the calculated threshold, the process proceeds to operation 410 and the computing platform 104 disables the V2X communications and inform the user about the disablement. Otherwise, the process proceeds to operation 412 and the computing platform 104 continues to use or enables the V2X communications. Similarly, the vehicle 102a may indirectly detect signal interference using channel busy ratio (CBR) in addition to or in lieu of the average PER under substantially the same concept illustrated with reference to FIG. 4.

Additionally, information about the infrastructures 182 may be used to detect signal interference. Since the infrastructures 182 are at fixed reference locations, nominal expected radio reception characteristics may be recorded. For instance, the nominal expected radio reception characteristics may include predefined PER performance from the infrastructures 182 to the vehicle V2X at a given location. If the vehicle 102a does not receive transmission from a reference infrastructure 182 in the expected location, the vehicle 102a may flag a possible interference at this location.

Figure 5A:
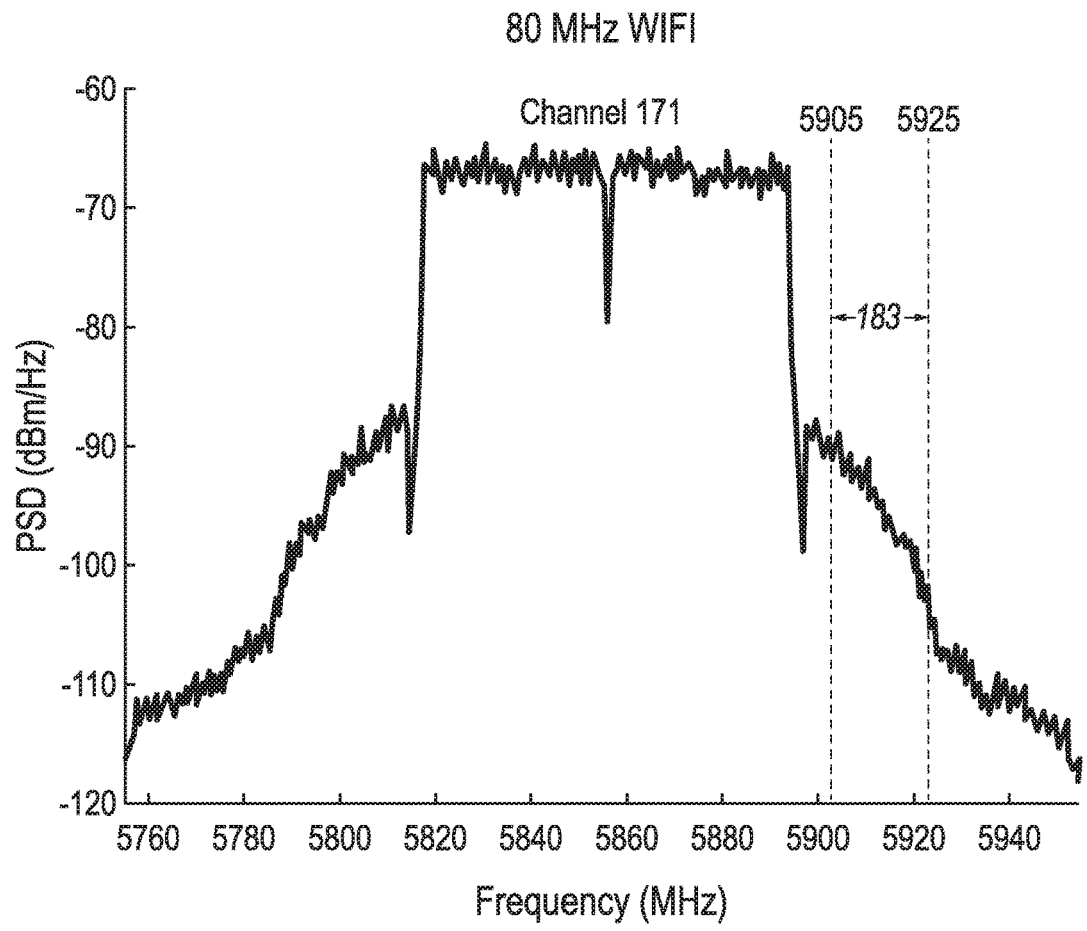
FIG. 5A and FIG. 5B illustrate example waveform diagrams of out-of-band emission (OOBE) of one embodiment of the present disclosure.
Figure 5B:
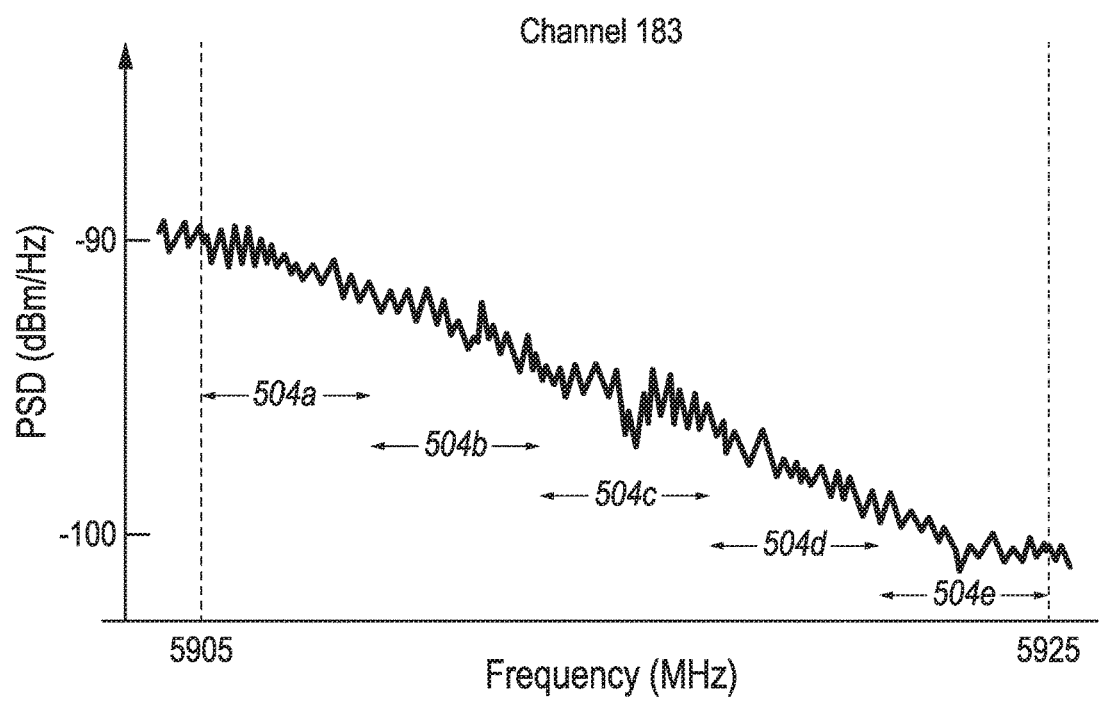

Referring to FIGS. 5A and 5B, example waveform diagrams of OOBE detection of one embodiment of the present disclosure are illustrated. In the present example, the vehicle 102a may have Channel 183 ranging from 5.905-5.925 GHz in frequency activated for V2X communications while an interference is coming from Wi-Fi Channel 171 having a bandwidth of 80 MHz from 5.815-5.895 GHz. In this case, although the frequency of Wi-Fi Channel 171 does not overlap with the frequency of ITS Channel 183, the OOBE from Channel 171 may still cause interference to the V2X communications because the frequencies are close. The vehicle 102a may be configured to detect the OOBE based on the characteristics of the waveform in the frequency of the active ITS channel (i.e. Channel 183 in the present example). Referring to FIG. 5B, Channel 183 may be divided into multiple subchannels. Each subchannel may have a bandwidth from 1-4 MHz. For instance, Channel 183 may be divided into five subchannels 504 each having a bandwidth of 4 MHz. In the present example, it may be assumed that the TCU 170 does not detect any V2X packet when the OOBE gradient is determined. The vehicle 102a may be configured to measure a power spectral density (PSD) at each subchannel to determine a PSD gradient from OOBEs of Wi-Fi signals for the subchannel. As illustrated in FIG. 5B, the PSD at a first channel 504a of Channel 183 may measured around −90 dBm/Hz whereas the PSD at a fifth channel 504e may be measured around −100 dBm/Hz. Therefore, an average OOBE gradient of −0.5 dBm/MHz (i.e. −10/20 dBm/MHz) may be determined, the average OOBE gradient for Channel 183 may be compared with a predetermined threshold to determine/infer an OOBE interference. For instance, the threshold me be +/−0.25 dBm/ MHz, which is exceeded by the measurement of the present example indicating the OOBE interference is detected.

Figure 6A:
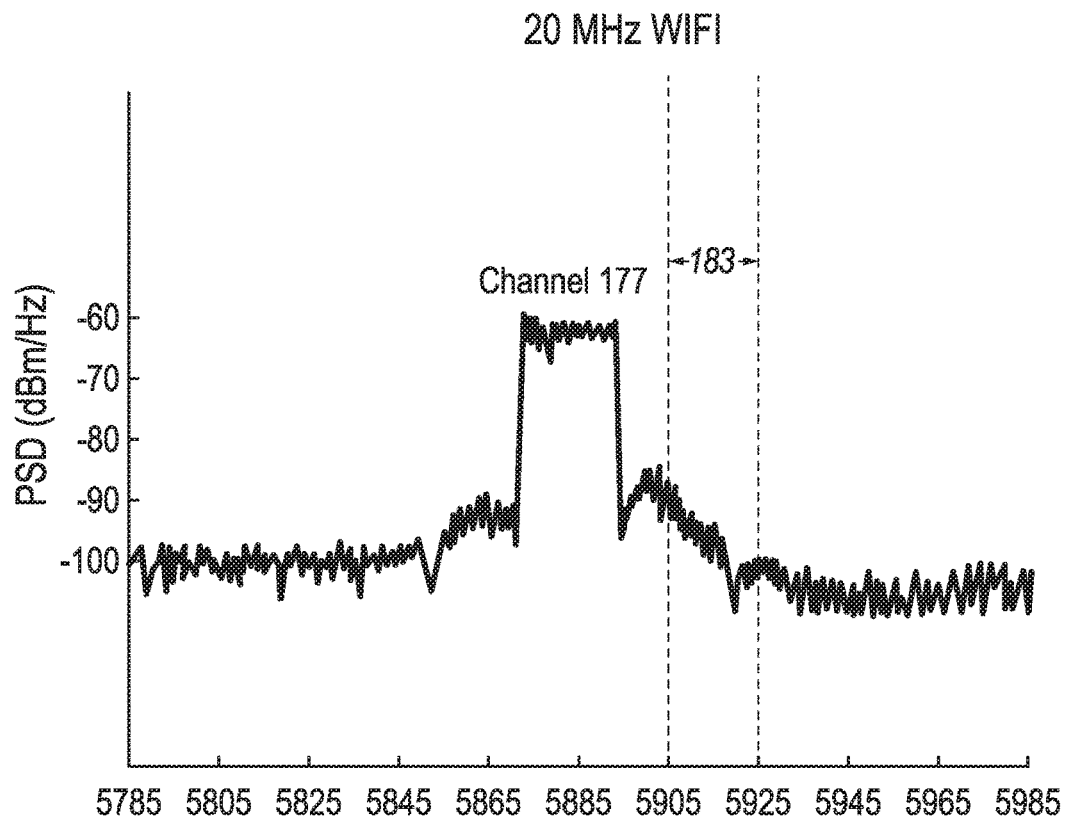
FIG. 6A and FIG. 6B illustrate example waveform diagrams of OOBE of another embodiment of the present disclosure.
Figure 6B:
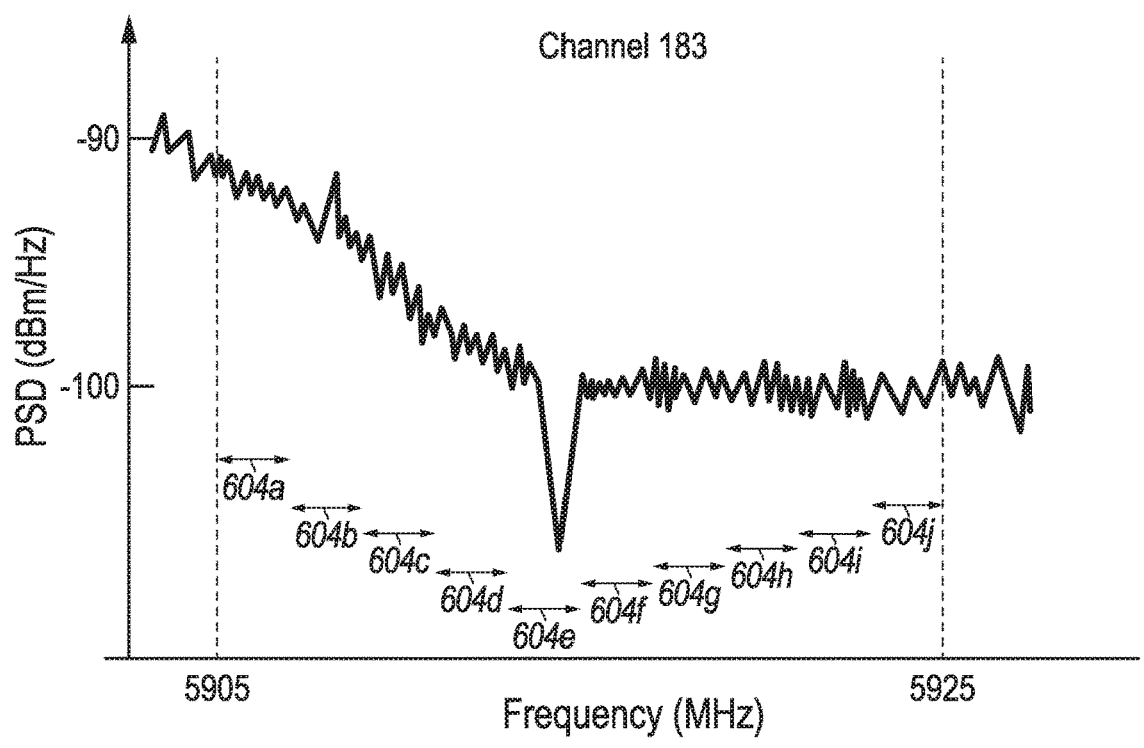

Referring to FIGS. 6A and 6B, example waveform diagrams of OOBE detections of another embodiment of the present disclosure are illustrated. Different from the example illustrated with reference to FIGS. 5A and 5B, in the present example, the OOBE comes from Wi-Fi Channel 177 having a 20 MHz bandwidth from 5.875-5.895 GHz. ITS Channel 183 may be divided into ten subchannels 604 each having a 2 MHz bandwidth in the present example. As illustrated in FIG. 6B, the PSD gradient is inconsistent throughout the bandwidth of Channel 183. The PSD continues to decline from −90 dBm/Hz at the first subchannel 604a to −100 dBm/Hz at the fourth subchannel 604d, but remains relatively steady at −100 dBm/Hz from the fifth subchannel 604e until the tenth subchannel 604j. The vehicle 102a may be configured to measure a partial OOBE gradient for two or more subchannels to determine interference. In the present example, the partial OOBE gradient of −1.25 dBm/MHz (i.e. −10/8 dBm/MHz) may be calculated from subchannels 604a-604d, the partial OOBE gradient may be compared with a threshold to determine if an interference is present.

In an alternative example, the vehicle 102a may be further configured to detect the OOBE interference when TCU 170 or DSRC 180 estimates a high average RSSI across a set of contiguous subchannels in a time interval but does not successfully decode a number of V2X packet corresponding to the high average RSSI. If the average RSSI of these subchannels exceeds a threshold then regardless of the gradient it may be probably caused by OOBE interference. In this embodiment, it is unnecessary to always have an OOBE gradient due to distortion by wireless channel conditions. Moreover, unlike the example illustrated with reference to FIG. 3 where the TCU 170 and/or wireless transceiver 132 directly measure RSSI in the Wi-Fi channel, here the system may measure the RSSI in the V2X channel and being unable to find V2X packets despite a strong RSSI would indicate harmful interference.

The present disclosure may extend to Roadside Equipment/Unit (RSE or RSU) that is also receiving and sending important V2X messages. The RSU may also experience interference and since the location of the RSE is fixed, this interference could be significantly harmful since it can be persistent for a particular location. For example, an RSU mounted on a street light pole next to an intersection could be close to a Wi-Fi access point a few feet away. In one example messages intended for an RSU that is close to such a Wi-Fi AP could be lost or impaired due to the interference from the AP. The RSU may perform the same detection mechanism as the V2X on-board unit in the vehicle and stores it internally or has it reported to the cloud.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a human-machine interface (HMI) device, configured to interact with a user;
a wireless transceiver;
a camera; and
a controller, configured to responsive to the wireless transceiver detecting a signal strength of a wireless transmission from one or more sources at a predefined frequency exceeding a predefined threshold, output a message via the HMI device to instruct a user to switch off a wireless device associated with the user, and responsive to continuing to detect the signal strength of the wireless transmission exceeding the threshold, output an alert, via the HMI device, to inform the user of a vehicle-to-everything (V2X) communication disablement, record an identity of the one or more sources and a location of the vehicle, capture an image outside the vehicle using the camera, and upload the identity of the one or more sources, the location of the vehicle and the image to a cloud server.

2. The vehicle of claim 1, wherein the controller is further configured to:

responsive to receiving a user confirmation via the HMI device, re-scan for the wireless transmission.

3. The vehicle of claim 1, wherein the controller is further configured to:

responsive to detecting the signal strength of the wireless transmission below the threshold, keep the V2X communication enabled and output a confirmation message to the user via the HMI device.

4. The vehicle of claim 1, wherein the controller is further configured to:

calculate an average packet-error-rate (PER) for the V2X communication within a predefined period of time; and verify a count of entities communicating with the vehicle via the V2X communication and a distance of each entity from the vehicle.

5. The vehicle of claim 4, wherein the controller is further configured to:

calculate a PER threshold using the count and distance; and responsive to verifying the average PER exceeding the PER threshold, disable the V2X communication.

6. The vehicle of claim 1, wherein the controller is further configured to:

calculate an average channel busy ratio (CBR) for the V2X communication within a predefined period of time;

verify a count of entities communicating with the vehicle via the V2X communication and a distance of each entity from the vehicle;

calculate a CBR threshold using the count and distance; and responsive to verifying the average CBR exceeding the CBR threshold, disable the V2X communication.

7. The vehicle of claim 1, wherein the V2X communication occupies at least one of Intelligent Transportation System (ITS) band channels 172 to 184, and the wireless transmission is an Unlicensed National Information Infrastructure (U-NII) Wi-Fi transmission occupying at least one channel having the predetermined frequency overlapping at least one of the ITS channels.

8. The vehicle of claim 1, wherein the identity of the one or more sources includes a service set identification of an access point associated with the one or more sources, and a device identification of a wireless device enabling the access point.

9. A method for a vehicle, comprising:

calculating, via a controller, an average packet-error-rate (PER) for a vehicle-to-everything (V2X) communication via a wireless transceiver within a predefined period of time;

verifying, via the controller, a count of entities communicating with the vehicle via the V2X communication and a distance of each entity from the vehicle;

adjusting, via the controller, a PER threshold using the count and distance such that the PER threshold increases responsive to at least one of the count and an average distance to each of the entities increasing; and responsive to verifying the average PER exceeding the PER threshold, disabling the V2X communication through the wireless transceiver, informing a user of the vehicle about the disabling of the V2X communication via a human-machine interface (HMI) device, recording a vehicle location through a location device, recording an identity of one or more entities, capturing, via a camera of the vehicle, an image outside the vehicle, and uploading the identity, the vehicle location and the image, via the wireless transceiver, to a cloud server.

10. The method of claim 9, further comprising:

responsive to verifying the average PER exceeding the PER threshold, outputting a message via the HMI device to instruct the user to disable a wireless device associated with the user.

11. The method of claim 9, wherein the V2X communication occupies at least one of Intelligent Transportation System (ITS) band channels 172 to 184, and the wireless transmission is an Unlicensed National Information Infrastructure (U-NII) Wi-Fi transmission occupying at least one channel having the predetermined frequency overlapping at least one of the ITS channels.

* * * * *